(12) United States Patent
Cox et al.

(10) Patent No.: US 9,708,078 B2
(45) Date of Patent: Jul. 18, 2017

(54) AIRPORT TERMINAL TRAFFIC AND PARKING MANAGEMENT SYSTEM

(71) Applicants: Isaiah W. Cox, London (GB); Joseph J. Cox, Portland, OR (US)

(72) Inventors: Isaiah W. Cox, London (GB); Joseph J. Cox, Portland, OR (US)

(73) Assignee: Borealis Technical Limited, Gibraltar (GI)

( * ) Notice: Subject to any disclaimer, the term of this patent is extended or adjusted under 35 U.S.C. 154(b) by 251 days.

(21) Appl. No.: 14/341,755

(22) Filed: Jul. 25, 2014

(65) Prior Publication Data
US 2015/0217873 A1    Aug. 6, 2015

(30) Foreign Application Priority Data
Jan. 31, 2014    (WO) ................ PCT/US2014/014246

(51) Int. Cl.
*B64F 1/22*    (2006.01)
*B64F 1/305*    (2006.01)
*B64F 1/315*    (2006.01)

(52) U.S. Cl.
CPC .............. *B64F 1/225* (2013.01); *B64F 1/305* (2013.01); *B64F 1/315* (2013.01)

(58) Field of Classification Search
CPC ........... B64F 1/225; B64F 1/305; B64F 1/315
See application file for complete search history.

(56) References Cited

U.S. PATENT DOCUMENTS

| | | | | |
|---|---|---|---|---|
| 3,184,772 A | * | 5/1965 | Moore | B64F 1/3055 14/71.5 |
| 3,489,297 A | * | 1/1970 | Jenkins | B64F 1/222 187/211 |
| 3,538,529 A | * | 11/1970 | Breier | B64F 1/3055 14/71.5 |
| 4,620,339 A | * | 11/1986 | Shepheard | B64F 1/305 138/114 |
| 4,712,339 A | * | 12/1987 | Wenham | B64F 1/305 14/71.5 |
| RE32,687 E | * | 6/1988 | Shepheard | B64F 1/362 138/114 |
| 6,305,484 B1 | * | 10/2001 | Leblanc | B60T 7/16 180/167 |
| 6,315,243 B1 | * | 11/2001 | Peterson | B64F 1/00 244/114 R |

(Continued)

*Primary Examiner* — Justin Benedik

(57) ABSTRACT

An airport terminal traffic and parking management system, which can be automated, is provided wherein one or more and preferably a plurality of the aircraft at an airport are moved on the ground between landing and takeoff without operation of aircraft engines or risks from jet blast and engine ingestion. Aircraft can be moved in a forward direction by tow vehicles, aircraft-moving transfer apparatus, or the like after landing to park in an efficient orientation relative to an airport terminal. Passengers deplaning and boarding and aircraft servicing can use all accessible aircraft doors to minimize time at a gate. Aircraft cleared for departure can be turned and moved in a forward direction to a takeoff runway, where the aircraft-moving apparatus is detached. Airport terminal aircraft traffic and parking are most effectively managed when a significant number of aircraft at an airport are moved by external vehicles as described.

11 Claims, 5 Drawing Sheets

(56) References Cited

U.S. PATENT DOCUMENTS

| | | | | |
|---|---|---|---|---|
| 6,487,743 | B1 * | 12/2002 | Nicoletti | B64F 1/305 14/71.3 |
| 6,496,996 | B1 * | 12/2002 | Worpenberg | B64F 1/3055 14/71.5 |
| 6,914,542 | B2 * | 7/2005 | Hutton | B64F 1/00 244/114 R |
| 7,603,736 | B2 * | 10/2009 | Hutton | B64F 1/3055 14/71.5 |
| 7,975,959 | B2 * | 7/2011 | Perry | B64C 39/024 244/50 |
| 2002/0104176 | A1 * | 8/2002 | Thomas | B64F 1/305 14/71.5 |
| 2005/0196256 | A1 * | 9/2005 | Rodenkirch | B64F 1/227 414/426 |
| 2006/0278756 | A1 * | 12/2006 | Marshall | B64F 1/22 244/50 |

* cited by examiner

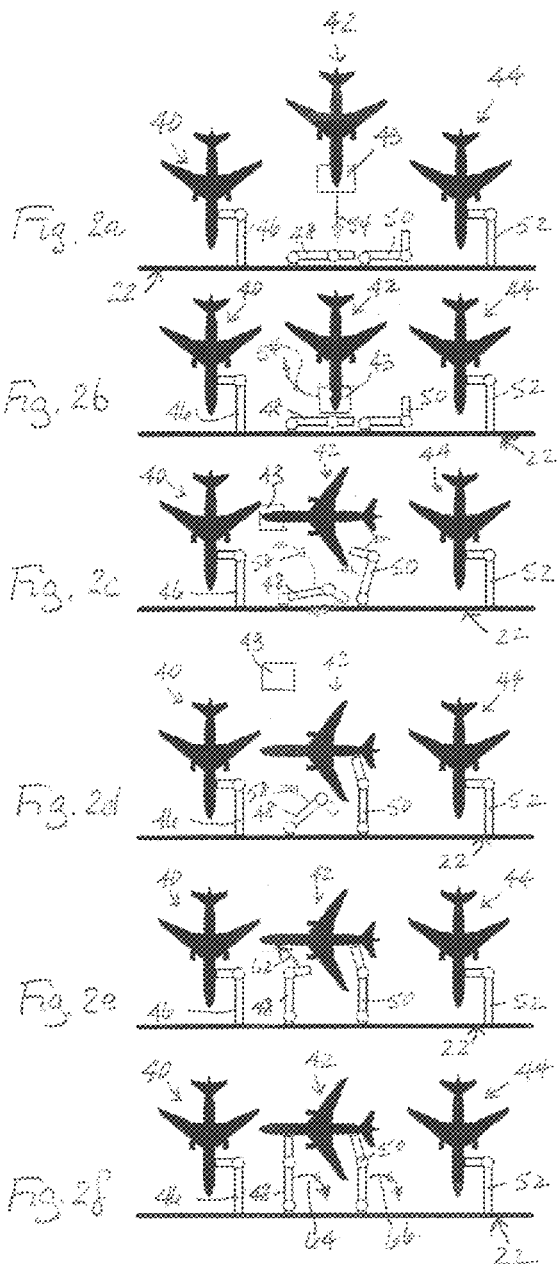
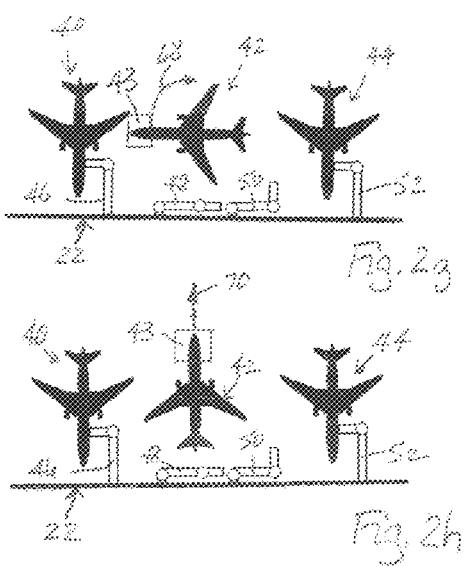

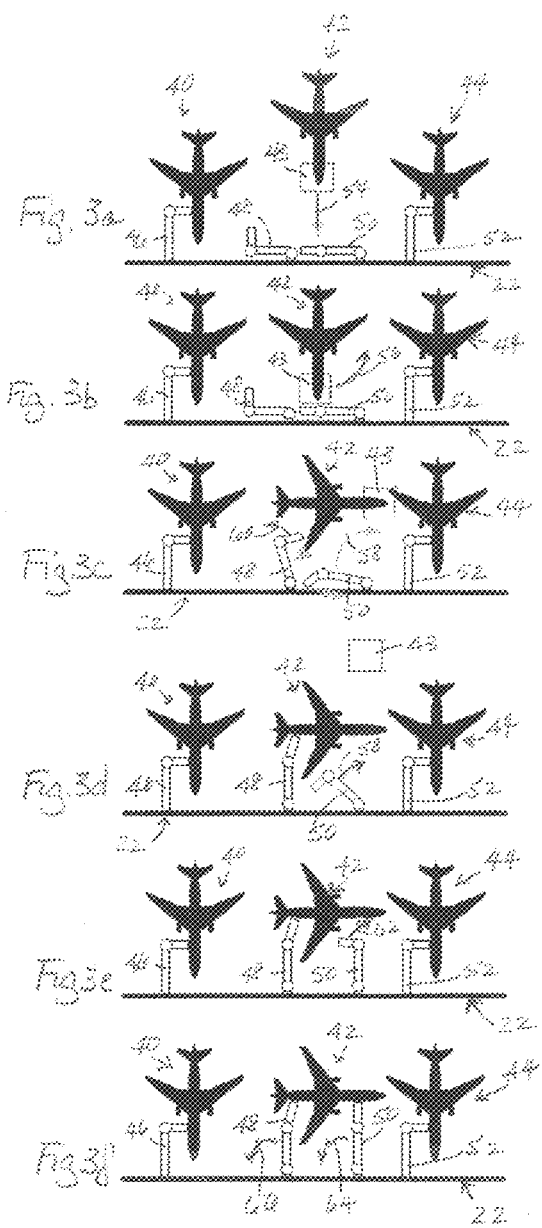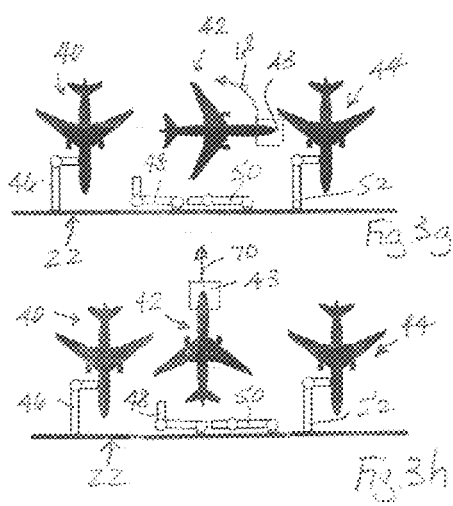

AIRPORT TERMINAL TRAFFIC AND PARKING MANAGEMENT SYSTEM

PRIORITY CLAIM

This application claims priority from International Patent Application No. PCT/US2014/014246, filed 31 Jan. 2014, now withdrawn, the disclosure of which is fully incorporated herein by reference.

TECHNICAL FIELD

The present invention relates generally to the management of aircraft traffic and parking at an airport terminal and specifically to a system that significantly increases the efficiency with which aircraft ground traffic and parking can be managed in the vicinity of the terminal, such as at gates and parking stands, to minimize the time required for aircraft arrivals, unloading and loading, servicing, departures, and other turnaround activities.

BACKGROUND OF THE INVENTION

As numbers of airline flights have increased to accommodate increasing numbers of air travelers, many of the world's airports, aerodromes, and air fields have experienced a concomitant increase in use that their terminals and other facilities were not designed to handle. In airports with high flight volume, terminal gate and other space for arriving aircraft to park, unload passengers and cargo, be serviced, and then load for departure is at a premium. As a result, delays are far too frequently the norm as aircraft must wait until cleared upon arrival to proceed to a gate or to be cleared for pushback to leave a gate upon departure. To minimize delays and keep flights on schedule, accommodating a large number of arriving aircraft requires an airport to supply a large number of terminal parking spaces, at gates or other locations, as well as personnel and service vehicles to direct gate traffic and provide baggage transfer and other services. Similarly, accommodating a large number of departing aircraft requires an airport to supply a large number of pushback tugs and personnel to clear parking space at a terminal for arriving aircraft. Increasing the numbers of gates or parking locations at an airport might help to alleviate the situation. This potential solution, however, involves the costly and time-consuming permitting and construction of airport facilities that few, if any, airports are presently able to undertake.

Most aircraft terminals use passenger loading bridges at gates that are spaced to provide and maintain the necessary clearance between the wingtips of designated kinds of aircraft that park at the gates between arrival and departure. If the required clearance between an aircraft scheduled to arrive at a designated gate and the two aircraft parked at immediately adjacent gates is not available, the arriving aircraft cannot taxi to its designated gate until at least one of the other aircraft is pushed back from the gate. The resulting delay not only leaves passengers in the arriving aircraft sitting in the aircraft on the tarmac, possibly missing connecting flights, but also leaves departing passengers in the terminal waiting. This sort of delay can have a far-reaching domino effect that plays havoc with passengers' and airlines' schedules and can ultimately negatively impact airlines' service and profits. Even when aircraft do not use passenger loading bridges or jet bridges to transfer passengers between the aircraft and a terminal, space to park the aircraft close to the terminal may not be available when needed if departing aircraft cannot be pushed back on schedule due to a range of constraints, including possible jet blast from incoming or departing aircraft.

Systems for alleviating aircraft parking at airport terminal gates to avoid delay and shorten turnaround time have been proposed. McClain et al, for example, describe in U.S. Pat. No. 3,489,297 a method and system for parking aircraft at crowded terminals that provides a ground level platform, which is elevated after an aircraft drives onto it so that the aircraft's wings overlap the wings of adjacent aircraft, allowing more aircraft to be parked at terminal gate areas than would otherwise be permitted. In U.S. Pat. No. 6,914,524, Hutton describes a method and system for improving aircraft gate parking at an airport that defines parking spaces at an airport terminal for aircraft of a known type and moves passenger loading bridges to accommodate the minimum clearance required for this type of aircraft. The positions of passenger loading bridges are adjusted as needed to accommodate aircraft arriving at defined parking spaces. A computer-based system with a database of information relating to aircraft arrival times and defined parking space availability in communication with bridge controllers is updated at selected intervals or during peak traffic periods to ensure that aircraft are parked efficiently. The McClain et al system requires disruption of gate areas to construct the disclosed parking platform apparatus, which, once constructed, is likely to be rather unwieldy in operation. The Hutton system could help to alleviate airline or aircraft delays specifically due to parking challenges. Neither of the aforementioned systems, however, addresses other significant causes of airport terminal gate traffic delays.

Aircraft are currently parked at airport terminals and gates as described and shown in the aforementioned patents with the nose end of the aircraft pointed toward the terminal or gate. This parking orientation is used because an aircraft uses one or more of its engines to power its travel from a landing location to a parking location. When an aircraft's engines are operating, jet blast and engine ingestion can compromise the safety of persons and ground equipment within the engine hazard area, especially near a gate or terminal where there are likely to be greater numbers of personnel and equipment, as well as other aircraft. When all aircraft are parked in the same nose-in orientation, the danger areas where engine ingestion or jet blast could occur when aircraft engines are operating are at least somewhat predictable. Other aircraft parking orientations besides the currently used nose-in orientation could allow more aircraft to park at gates, stands, or other parking areas near an airport terminal. For example, parking an aircraft with the longest axis of the aircraft body parallel to the terminal or at an angle relative to the terminal other than the perpendicular orientation currently used may actually allow more efficient use of terminal parking space resources. The present need to use aircraft engines to drive aircraft to terminal gates and other parking areas, however, prohibits the use of these aircraft parking orientations because of the risks of jet blast and engine ingestion associated with aircraft engine operation.

A need exists, therefore, for an airport, aerodrome, or air field terminal aircraft traffic and parking management system that manages aircraft traffic into and out of gate and other parking locations to eliminate many of the causes for delays affecting departing and arriving aircraft traffic and that enhances traffic flow and the efficiency of airport parking and gate operations without the time and expense of designing and building new airports or significantly altering existing airport structures.

SUMMARY OF THE INVENTION

It is a primary object of the present invention, therefore, to provide an airport, aerodrome, or air field terminal aircraft traffic and parking management system that eliminates many of the causes for delays affecting departing and arriving aircraft gate traffic and enhances traffic flow and the efficiency of airport gate operations with only minor modifications to existing airport structures.

It is another object of the present invention to provide an airport terminal gate traffic and parking management system that effectively minimizes an aircraft's time at a terminal between arrival and departure both at terminal gates, stands, and parking spaces equipped with passenger loading bridges and at terminal gates, stands, and parking locations that are not equipped with these or other connecting structures where passengers must use stairs to enter and leave aircraft and walk on the tarmac to a terminal entrance.

It is another object of the present invention to provide an airport terminal traffic and parking management system wherein aircraft can be guided to park parallel to a terminal without subjecting persons and equipment to the danger associated with jet blast and engine ingestion.

It is another object of the present invention to provide an airport terminal traffic and parking management system that enables the smooth free flow of aircraft traffic into and out of terminal gates and aircraft parking spaces, thereby increasing terminal throughput without the time and costs needed for new terminal facilities.

It is an additional object of the present invention to provide an airport terminal traffic and parking management system that moves aircraft into and out of parking locations without using the aircrafts' engines.

It is yet another object of the present invention to provide an airport terminal traffic and parking management system that facilitates the simultaneous unloading of arriving passengers and loading of departing passengers in aircraft equipped with multiple passenger exits and entrances.

It is yet a further object of the present invention to provide an airport terminal aircraft gate traffic management system that permits parking an aircraft to locate passenger-related facilities and/or aircraft service-related facilities on a designated selected side of an aircraft toward or away from a terminal.

It is still another object of the present invention to provide an automated airport terminal traffic and parking management system that facilitates efficient aircraft traffic flow and terminal throughput.

It is a still further object of the present invention to provide an airport terminal traffic and parking management system that enables an aircraft to be moved out of a parking space as soon as cleared from ground interference without currently required formal approval.

It is a still further object of the present invention to provide an airport terminal traffic and parking management system that permits an aircraft to be maneuvered into and out of a gate or other parking space by moving the aircraft only in a forward direction without danger from jet blast or engine ingestion.

It is a still further object of the present invention to provide an airport terminal traffic and parking management system that provides an automated mechanism designed to guide an aircraft in a forward direction along a fixed path to a parking location oriented substantially parallel or perpendicular to the terminal upon arrival and then along a fixed path away from the terminal upon departure.

In accordance with the aforesaid objects, an airport terminal traffic and parking management system is provided wherein one or more and preferably a plurality of the aircraft landing, parking, moving on the ground, and taking off from an airport are moved on the ground without use of the aircraft's main engines to enable the free flow of aircraft traffic into and out of terminal gates and parking stands. Aircraft may be moved after engines have been shut down upon touchdown to a terminal parking location or gate by tow vehicles, aircraft-moving transfer modules, and the like. Aircraft are towed or moved in a forward direction so that they may park in any parking orientation, from the traditional nose-in orientation to an orientation parallel to the terminal without the hazards of jet blast or engine ingestion in a parking space sized to provide clearance for aircraft to maneuver into and out of the space while traveling only in a forward direction. Passengers can leave and/or board aircraft virtually immediately after parking by jet bridge or by stairs at the aircraft exits. When an aircraft is cleared for departure, the aircraft is attached to a tow vehicle, aircraft-moving transfer module, or the like and towed or moved in a forward direction out of its terminal gate or parking space without operation of the aircraft's engines. Providing flexibly movable jet bridges and/or service equipment at gates and other parking areas facilitates their movement and connection to the aircraft when needed and their removal from an aircraft's clearance area when the aircraft is ready to leave a parking space. Airport terminal traffic and parking are most effectively managed when a significant number of aircraft at an airport are moved as described, although aircraft gate traffic management is facilitated when even only a small number of aircraft are moved in this manner.

Alternatively, instead of attaching an aircraft to a tow vehicle, an aircraft-moving transfer module, or the like, the aircraft could be attached to a conveyor track, preferably built into the tarmac surface in a terminal ramp area and designed to move an attached aircraft to be oriented either perpendicular or parallel to the terminal building when parked. The action of the conveyor track moves the aircraft in a forward direction along the path defined by the track to a parking location, where its action is stopped so that passengers can be unloaded. When the aircraft is ready for departure, the conveyor track may be activated to move the aircraft in a forward direction along a defined departure path away from the terminal to a desired location, such as one where the aircraft's engines may be started. Selected aspects of the airport terminal traffic and parking management system of the present invention may be automated to enhance system performance, traffic flow, and aircraft turnaround efficiency. With the exception of the conveyor track embodiment, the present airport terminal traffic and parking management system can be implemented with only very minor, if any, modifications to existing airport structures or facilities and, therefore, can avoid the challenges and costs associated with obtaining regulatory permits, approvals, or licenses and construction.

Other objects and advantages will be apparent from the following description, claims, and drawings.

BRIEF DESCRIPTION OF THE DRAWINGS

FIGS. 2a-2h are diagrams of an airport terminal with three aircraft parked at gates with flexibly movable jet bridges, where one aircraft is shown being moved by a tow vehicle or aircraft-moving transfer module into a gate, being parked parallel to the gate, connecting to a pair of extended jet bridges to permit simultaneous passenger departure and boarding at front and rear exits prior to departure from the gate, and after receiving departure clearance and the jet bridges have been moved out of the way, being moved to depart the gate;

FIGS. 3a-3h are diagrams showing the same sequence of steps as in FIGS. 2a-2h, except the aircraft is moved by a tow vehicle or aircraft-moving transfer module to park in an orientation parallel to the gate with cargo doors facing toward the terminal rather than away from the terminal;

DESCRIPTION OF THE INVENTION

Figure 1:
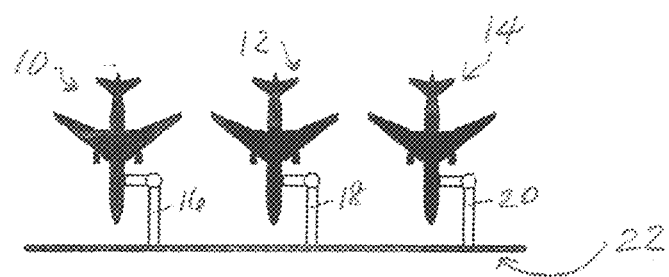
FIG. 1 is a diagram of an airport terminal showing a typical situation currently found at airports, in which three aircraft are parked at gates and connected to passenger loading bridges at an airport where the aircraft use both engines and tow vehicles to move them on the ground in a forward direction to park at terminal gates on arrival and in a reverse direction out of terminal gates upon departure.

Increasing the efficiency with which airport gate operations can be conducted to move aircraft, passengers, and cargo as quickly and safely as possible between arrival and departure continues to be a goal of airports and airlines. Inefficiencies and delays can have both local and widespread undesirable effects for both passengers and airlines. The present airport terminal traffic and parking management system, which enables the free flow of aircraft gate traffic, provides a number of advantages. The present system increases the safety and efficiency of gate operations by eliminating jet blast and engine ingestion hazards associated with operating aircraft engines near an airport terminal, as well as at least some of the ground personnel and vehicles needed to support engines-on taxi into and out of gates and parking locations. Aircraft ground travel in the present traffic and parking management system is achieved, without operation of aircraft engines, by attaching and moving aircraft with tow vehicles, aircraft-moving transfer modules, and the like that may be controlled manually or automatically from within the aircraft or from a location remote to the aircraft to move aircraft in a forward direction. The efficiency of passenger movement into and out of a parked aircraft is maximized by the ability to use all aircraft passenger doors for deplaning and boarding, simultaneously, if desired. Flexibly movable jet bridges are preferably provided that can be extended to connect with a parked aircraft and then retracted to maximize space at a parking location so an aircraft has a least the minimum clearance required to turn and leave the parking location at departure. This arrangement also permits more aircraft to fit into terminal parking spaces. Servicing of aircraft can begin virtually immediately upon arrival at a parking space and can be made more efficient by providing fixed dedicated services equipment designed to connect directly to aircraft at the parking location. Additionally, the present traffic and parking management system can be completely automated to further improve traffic flow and the efficiency of airport gate operations.

With the exception of one alternate embodiment, the present airport terminal traffic and parking management system can be implemented with substantially minor, if any, modifications to existing airport or terminal structures. Any changes needed to implement the primary embodiments of the present system are likely to be covered by existing permits or authorizations. Neither the extensive renovation of existing airport facilities nor the demolition of these facilities and the design and construction of new facilities is required to obtain the significant improvements in traffic flow possible with these embodiments of the present invention. Consequently, the regulatory approvals, permits, and licenses required for airport or terminal renovation or new construction should not be needed. The time, costs, and challenges associated with obtaining these approvals and renovating existing airport or terminal structures or designing and constructing new ones are not considerations. The alternate embodiment of the present system, which employs a conveyor track embedded in the airport tarmac surface, will require some demolition and construction to install the track, as described below.

Referring to the drawings, FIG. 1 is a diagram of three aircraft 10, 12, and 14 parked at respective passenger loading bridges or jet bridges 16, 18, and 20, representing three airport terminal gates as they are currently used. The spacing between aircraft 10, 12, and 14 in FIG. 1 and the other drawings is not shown drawn to scale. Spacing and clearance between aircraft is discussed in connection with FIG. 4. The jet bridges 16, 18, and 20 are attached to a terminal building 22 and provide a protected walkway for passengers to move between an aircraft and the terminal building during both boarding and deplaning or departing the aircraft. Operation of each aircraft's engines is currently required to provide the power to move the aircraft into the gate so it is able to dock at and attach to a jet bridge, like jet bridges 16, 18, and 20. Passengers and crew cannot leave the aircraft until the aircraft engines have been turned off, and ground personnel and service vehicles must also stay clear of the aircraft until the engines are off. The dangers from jet blast and engine ingestion when aircraft engines are operating in a congested terminal area have been well documented, and providing a safe terminal environment requires waiting to unload and service aircraft until the engines are shut down, even if delays in gate operations result.

When the aircraft in FIG. 1 are cleared for departure, tugs or tow vehicles (not shown) must be connected to the nose ends of the aircraft to push them back in a reverse direction from the terminal building 22 to a location where at least one of the engines can be started and the aircraft can be moved in a forward direction to a takeoff runway. At some airports, powered pushback, in which aircraft engines are operated in reverse thrust, is another option for moving aircraft away from terminal parking places. This option, however, is accompanied by jet blast and engine ingestion hazards. Terminal gates typically provide sufficient space so that only one aircraft at a time can be pushed back and depart the gate. The current gate traffic system, with its widely acknowledged potential for inefficiency and airline schedule delay, desperately needs improvement to accommodate increasing air travel.

When space at terminal gates or other aircraft parking areas is tight, as is the case at many airports, aircraft today, in which ground movement is powered by the aircraft's engines, cannot maneuver effectively. Such aircraft not only have difficulty turning with a precise turning radius and cannot precisely control the distance traveled, and the challenges of jet blast and engine ingestion are present as long as the engines are operating. Consequently, driving aircraft into and out of gates with the engines operating is not a viable option in today's airports. FIGS. 2a-2h and 3a-3h illustrate the improvements gate traffic and parking management possible when aircraft are moved in a forward direction into and out of gates or other parking locations without using the aircraft's engines.

The passenger loading bridges or jet bridges shown in FIGS. 2 and 3 have a different design than the jet bridges shown in FIG. 1. This design allows extension of the jet bridges away from a terminal building toward an aircraft to connect with the aircraft for passenger movement and retraction of the jet bridge toward the terminal building to maximize a clear area around the aircraft. This permits an aircraft to be moved in a forward direction as it leaves the gate, as described below. There are available jet bridge designs that can accomplish this purpose. One suitable type of jet bridge 18, shown in FIGS. 2a-h, 3a-h, and 6a-e of the drawings, has two articulation points, compared to the single articulation point provided in the jet bridges shown in FIG. 1. Other movably flexible jet bridge designs that provide similar flexibility to permit extension toward an aircraft and retraction out of the gate area to occupy minimal space are contemplated for use with the present system. Jet bridges could collapse in three dimensions, for example, toward the terminal, toward the ground, or toward a side. They could also be moved vertically upward or downward in their typical locations to avoid contact with aircraft wings. Jet bridges with a collapsible and extendible concertina-type structure, as well as jet bridges on wheels, are also available and could be used as described herein. A "pop-up" jet bridge that is raised and lowered into a ground space would also be useful in the present system. One suitable type of jet bridge useful in the present invention is an extendable and retractable jet bridge available under the name of Crystal Bridge from ThyssenKrupp Airport Systems. Any other passenger loading bridge or jet bridge in addition to those described above that can connect to a parked aircraft to transfer passengers directly between a terminal and the aircraft and can then be collapsed, folded, retracted, or otherwise moved out of the parking space to provide a maximum area for aircraft gate traffic maneuvers as discussed below could be used effectively with the present gate traffic and parking management system. It is contemplated that any type of flexibly movable jet bridge type of structure that functions as described herein would be suitable for the present gate traffic and parking management system.

FIGS. 2a-2h are show one approach to gate traffic and parking management and gate operations according to the present invention. In this approach, aircraft 40 and 44 are shown parked conventionally at jet bridges 46 and 52, respectively. Aircraft 42 is being moved by a tow vehicle or an aircraft-moving transfer module, schematically represented at 43, which may be one of the types described below. Two jet bridges 48 and 50, articulated as described above, are shown moved close to the terminal building 22. Aircraft 42 is being moved along the path shown by arrow 54 with its nose end directed toward the terminal building 22. As aircraft 42 approaches the terminal building 22, the aircraft will be moved to turn in the direction of arrow 56 (FIG. 2b).

As shown in FIG. 2c, the aircraft 42 has been moved along the path of arrow 56 so that the aircraft nose has turned 90° away from the terminal building 22 and the longitudinal or longest axis of the aircraft 42 is parallel to the terminal building.

The jet bridges 48 and 50 are moved, substantially along the paths indicated by respective arrows 58 and 60 in FIGS. 2c and 2d, and jet bridge 48 is fully extended along the path indicated by arrow 62 in FIG. 2e. As indicated above, this is only one type of flexibly movable jet bridge suitable for use with the present invention and is intended only to be illustrative. What ever type of jet bridge is used, the two jet bridges 48 and 50 must be located at the terminal building 22 in locations that will enable them to be connected to an aircraft's front and rear doors when fully extended, as shown in FIG. 2f. In some situations, only a single jet bridge may be needed and will be extended and connected to a front or rear door of an aircraft. When two jet bridges are used, both the front and rear doors can be used for passengers leaving the aircraft upon arrival to minimize the time required to clear the aircraft and prepare it for a departing flight. Passengers can also board through both front and rear doors to minimize the time needed to board the aircraft prior to departure. To further maximize time savings, arriving passengers could be directed to leave the aircraft through one door and departing passengers could be directed to board the aircraft through the other door.

When all passengers and crew have boarded aircraft 42 and it is ready for departure, the jet bridges 48 and 50 are moved away from the aircraft, such as along the paths indicated by respective arrows 64 and 66 in FIG. 2f, to assume the positions shown in FIGS. 2g and 2h as close to the terminal as possible or otherwise out of the space required for aircraft 42 to be attached to a tow vehicle or aircraft-moving transfer module 43 and moved from its parked position parallel to the terminal 22 along the path indicated by arrow 68 in FIG. 2g. FIG. 2h illustrates aircraft 42 after it has been moved 90° along the path of arrow 68 so that the aircraft's nose end is pointing away from the terminal building 22, and the aircraft is ready to be moved without operation of its engines by the tow vehicle or transfer module 43 in a forward direction substantially along the path indicated by arrow 70 to a takeoff runway or other suitable location prior to takeoff where the aircraft's engines can be started to move the aircraft for takeoff.

Ground movement of an aircraft without operation of its engines can be produced by different methods. Tugs and tow vehicles can be used to move aircraft and are currently used primarily to push aircraft in reverse from a gate or parking location to a location in an airport ramp area where the aircraft can start its engines and move in a forward direction out of the ramp to a takeoff runway. In accordance with the present traffic and parking management system, a tow vehicle could be used to move an aircraft during all ground movement, upon landing and prior to takeoff, so that operation of the aircraft's engines is not required.

Any of the variety of tow vehicles available for attachment to aircraft to move them on the ground in a forward direction without engines is contemplated for use with the present traffic and parking management system. Most tow vehicles or tugs presently in use are operator-driven vehicles that may be attached to an aircraft's nose landing gear with a tow bar or are vehicles that do not use a tow bar, but, instead, lift the aircraft's nose landing gear and support it above the ground surface to enable the tug to move the aircraft. Tow vehicles of either of these types will require ground personnel to connect and disconnect them to an aircraft and then operate them to move the aircraft. Since such tow vehicles are already widely used at most airports, modifying them to move aircraft only in a forward direction as described herein should not be difficult.

Tow vehicles capable of moving aircraft on the ground with minimal assistance and involvement from ground personnel are also available. The automated aircraft towing vehicle system described in U.S. Pat. No. 6,305,484 by LeBlanc, the disclosure of which is incorporated herein by reference, for example, has a towing tractor that is adapted for remote steering, acceleration, and braking control to move an aircraft on the ground to a desired location. Once the aircraft has reached the desired location, the tow vehicle is detached from the aircraft, which could be accomplished remotely. An unmanned aircraft transfer system is described in U.S. Pat. No. 7,975,959 by Perry et al, the disclosure of which is incorporated herein by reference, and is controllable to move an aircraft on the ground. A transfer module moves the aircraft by skid steering, and control of this function is provided by one or more aircraft components. The transfer module is attached to the aircraft and then detached from the aircraft when it has reached a designated location. As with the use of a towing tractor or the automated towing vehicle system described above, the aircraft's engines are not needed to move the aircraft. Consequently, these and other available aircraft towing systems can be adapted as needed to move aircraft only in a forward direction into and out of terminal gates and to park parallel to a terminal as shown and described. The use of the term "tow vehicle" is intended to include, without limitation, any of the aforementioned vehicles or apparatus or any other vehicles or apparatus used to move aircraft on the ground.

If an airport's resources permit, a tow vehicle, such as one of the variations described above, may be attached to an aircraft after landing to move it and park it upon arrival at the terminal and remain attached to the aircraft and available to move the aircraft in a forward direction to a departure runway for takeoff. The ability to dedicate a tow vehicle to an aircraft, especially one designated for a short turnaround, presents the additional benefit of not having to delay departure. The time needed to retrieve and re-attach tow vehicles, transfer modules, or other similar apparatus that to move a departing aircraft to a location where the tow vehicle, transfer module, or the like is detached prior to takeoff would not be required. FIGS. 2 and 3 show a tow vehicle detached from aircraft 42 when the aircraft is parked and jet bridges are being connected to and connected to the aircraft.

It is contemplated that operation of the passenger loading bridges or jet bridges 48 and 50 to extend, connect with the aircraft 42, and then retract or to move in other ways can be fully automated and controlled by suitable control equipment, processors, and software accessible by aircraft flight crew, when necessary, as well as by airport gate and ground personnel in communication with the aircraft flight crew during normal operations. Proximity sensors and the like may be provided on the jet bridges and/or on the aircraft to assist with docking or connection, as well as to provide position information or alerts if an aircraft moves too close to a jet bridge while maneuvering as described herein.

In FIGS. 2a-2h, the aircraft 42 is shown in an orientation parallel to the terminal building 22 so that side of the aircraft with the doors currently used primarily for passenger egress and ingress is facing toward the terminal and the side of the aircraft with the cargo bay doors is facing away from the terminal. In this orientation, service vehicles, such as baggage carts, fuel vehicles, catering trucks and the like, can be limited to the side of the aircraft away from the terminal to keep all of this activity on one side of the aircraft, which could have benefits at some airports. FIGS. 3a-3h show the same sequence of aircraft arrival and departure maneuvers at a terminal with flexibly movable jet bridges as shown in FIGS. 2a-2h. In FIGS. 3c-3g, however, the aircraft 42 has turned 90° from its nose-in arrival position to assume a position parallel to the terminal building 22 with the cargo bay doors facing the terminal. Since aircraft have front and rear egress and ingress doors on both sides of the aircraft, this orientation does not affect passenger deplaning and boarding. In the aircraft orientation shown in FIGS. 3c-3g, access to cargo will be on the terminal side of the aircraft, which could facilitate baggage or cargo handling. A baggage conveyor, for example, could be located to extend out to the aircraft from the terminal so baggage can be placed directly on the conveyor when it is removed from the aircraft. Catering services could be similarly located and provided. Other services could also have dedicated supplies or sources fixed in place or connected with terminal or another source. Fuel, air, and/or water lines, for example, could be connected to the terminal, which could eliminate the need for vehicles supplying them. Additionally, the conduits and other means for providing these services could be flexibly movable to extend toward the aircraft during servicing and retract out of the way after servicing has been completed. Other equivalent arrangements are also contemplated to be included within the present system. The aforementioned service provision structures enable an aircraft's parking space to be cleared quickly and minimize service vehicle use in the parking area, which permits an aircraft pilot to confirm clearance from ground interference from these sources sooner than might otherwise be the case and depart from the terminal more quickly.

The aircraft 42 is moved toward the terminal building 22 nose-in along the path indicated by arrow 54 in FIG. 3a and then is moved to turn along the path indicated by arrow 56 (FIG. 3b) 90° in a direction opposite the direction in which aircraft 42 turns in FIG. 2c. As noted above, the side of the aircraft with the cargo doors is now facing the terminal 22. The flexibly movable jet bridges 48 and 50, shown moved away from the aircraft in FIGS. 3a and 3b, are moved as shown in FIGS. 3c-3e until they connect with the front and rear doors (not shown) of the aircraft 42 to permit arriving passengers to walk to the terminal and departing passengers to walk from the terminal to the aircraft. As discussed above, the time required for passenger egress and ingress can be minimized with this arrangement. When the aircraft is fully boarded and ready for departure, the jet bridges 48 and 50 move along paths indicated by arrows 64 and 66 out of the area needed for aircraft 42 to be moved to turn 90° along the path identified by arrow 68 in FIG. 3g to assume the nose-out position shown in FIG. 3h. The aircraft may be moved by a tow vehicle 43 in a forward direction along the path indicated by arrow 70 to a takeoff runway where the aircraft's engines are started just prior to takeoff.

Figure 4:
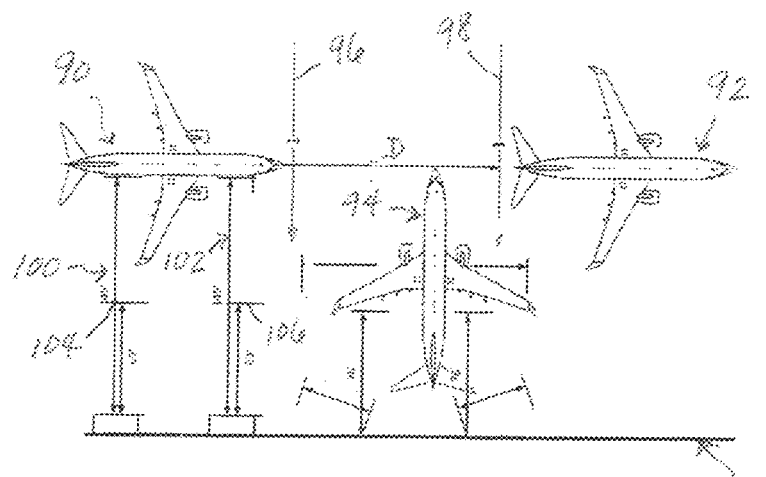
FIG. 4 is a diagram of clearances required for adjacent aircraft and available flexibly movable jet bridges when aircraft are moved in a forward direction to park parallel to an airport terminal gate as shown in FIGS. 2a-2h and 3a-3h.

FIG. 4 shows in greater detail the minimum clearance possible when an airport gate uses the double jet bridge configuration shown in FIGS. 2a-2h and 3a-3h. This clearance represents the narrowest gate distance possible and the smallest variation in distance possible when the longest and shortest collapsible passenger loading bridges or jet bridges available from ThyssenKrupp are used. Aircraft 90 and 92 are oriented parallel to the terminal building 88, and aircraft 94 is shown after turning and ready to move autonomously to a takeoff runway. The width of the gate where aircraft 94 is departing is indicated by the distance D between vertical lines 96 and 98, which represents sufficient clearance for aircraft 94 to turn from a nose-in to a nose-out position. Aircraft 90 is shown parked as far away from the terminal building 88 as is possible when the longest available jet bridges 100 and 102 are extended. The closest distance to the terminal 88 that an aircraft could be parked using the shortest available jet bridges is represented by lines 104 and 106. In some airports and in some weather conditions, parking closer to or farther from the terminal may have advantages.

Figure 5A:
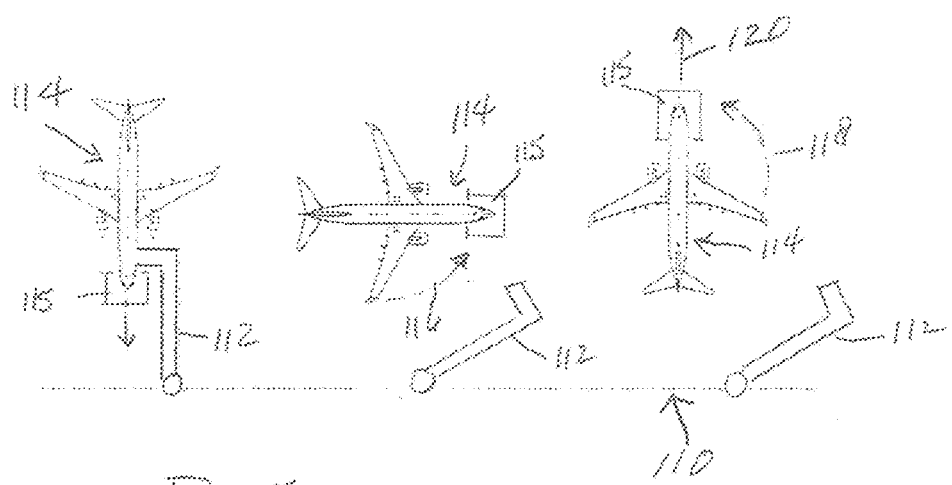
FIGS. 5a and 5b are diagrams further illustrating additional aircraft traffic flow possibilities for arriving aircraft being moved by a tow vehicle or aircraft-moving transfer module in a forward direction to park at a terminal and departing aircraft being moved in a forward direction to leave the terminal in accordance with the present gate traffic and parking management system.
Figure 5B:
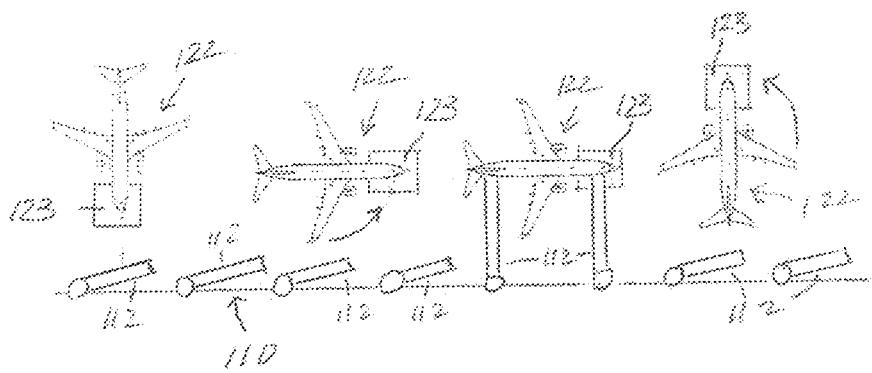
Figure 6A:
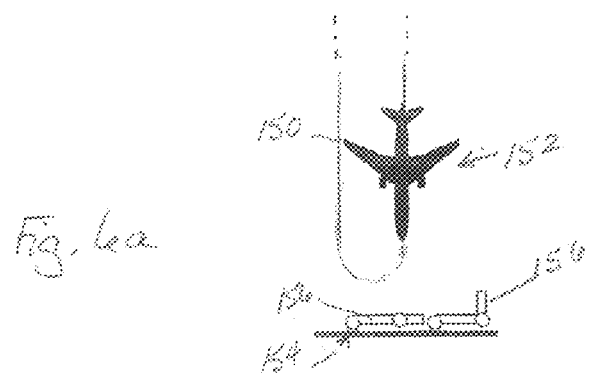
FIGS. 6a-6e are diagrams of an airport terminal gate area with flexibly movable passenger loading bridges, where an aircraft is attached to a conveyor track to move the aircraft in a forward direction to park at a gate and is then moved by the track in a forward direction out of the gate after the aircraft has been cleared for departure.
Figure 6B:
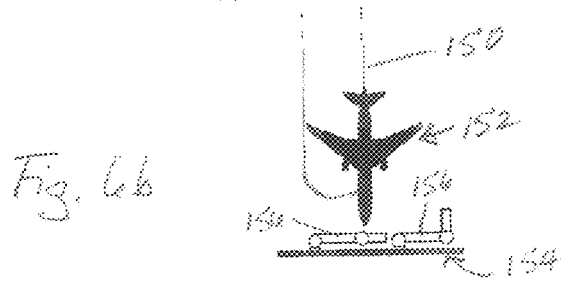
Figure 6C:
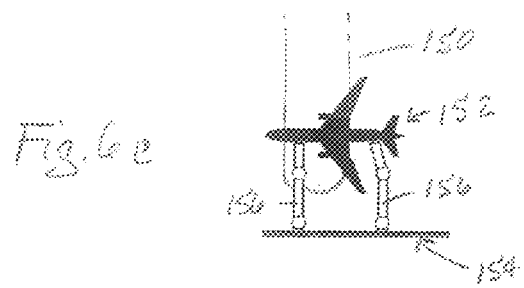
Figure 6D:
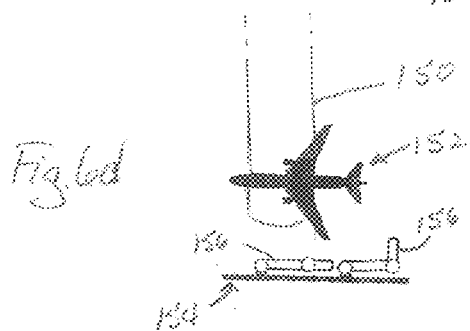
Figure 6E:
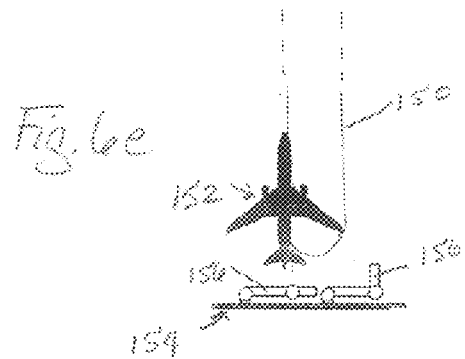

FIGS. 5a and 5b illustrate some additional aircraft terminal gate traffic flow possibilities in accordance with the present traffic and parking management system. In FIG. 5a, an aircraft terminal 110 has a number of flexibly movable jet bridges 112, three of which are shown. The jet bridges are shown in FIGS. 5a and 5b to be rotatably attached to the terminal 110 to rotate into and out of connection with aircraft doors. Other terminal and/or ground attachment structures and methods are also contemplated for use with the present traffic and parking management system. An aircraft 114 has been moved by a dedicated tow vehicle 115 to a jet bridge 112 and is parked at the terminal in a traditional nose-in position perpendicular to the terminal 110. The flexibly movable jet bridge 112 has been connected to the aircraft to permit the movement of passengers, crew, cleaning and other service personnel into and out of the aircraft while it is parked at the gate. When departing passengers have boarded, the flexibly movable jet bridge is moved away from the aircraft, and the aircraft cleared for departure, the tow vehicle 115 attached to the aircraft turns the aircraft 114 along a path indicated by the arrow 116 and then along a path indicated by arrow 118 to a nose-out position so the aircraft can leave the gate parking area, such as by a path indicated by arrow 120. The tow vehicle 115 may remain connected to the aircraft during these maneuvers, which minimizes the time needed to connect and disconnect the tow vehicle.

In FIG. 5b, the aircraft traffic flow through the gate differs from that shown in FIG. 5a in that the aircraft 122 is moved by a tow vehicle 123 toward the terminal in a nose-in position and then is moved 90° to park with the longest axis of the aircraft parallel to the terminal. The flexibly movable jet bridges 112 shown attached to the terminal in FIG. 5b are spaced differently than in FIG. 5a to accommodate connections to two aircraft doors, and the jet bridges are in a retracted position close to the terminal and away from gate parking spaces to facilitate parking of the aircraft parallel to the terminal. Upon arrival at the terminal 110, the aircraft 122 is moved by a tow vehicle as described to an assigned gate parking space or stand. Two flexible movable jet bridges 112 are shown extended to connect with the aircraft front and rear doors, although in some situations, only one jet bridge may be connected to the aircraft. When the aircraft is ready for departure, the jet bridges 112 can be moved away from the aircraft to clear the parking space, and the tow vehicle 123 moves the aircraft 90° so the nose is directed away from the terminal and then moves the aircraft away from the terminal to a location where the tow vehicle 123 is detached, and the aircraft can start its engines for takeoff.

All of the aircraft movements shown in FIGS. 5a and 5b are in a forward direction. This provides an aircraft pilot with the ability to keep the aircraft travel area in view while the aircraft is being moved into or out of the terminal parking area. While not necessary or desirable with the present traffic and parking management system, the aircraft could also be moved in reverse if a situation required it. All of the aircraft movements in connection with the present airport traffic and parking management system are in a forward direction.

The present traffic and parking management system has been discussed in connection with aircraft that use passenger loading bridges or jet bridges at terminal gates or stands to transfer passengers between an airport terminal and the aircraft. Airports in many countries do not have terminal buildings with jet bridges. In these airports, when an aircraft arrives at a gate, either the aircraft's stairs are lowered or ground personnel bring portable stairs to aircraft that do not have integral stairs. These aircraft can also benefit significantly from the gate traffic and parking management advantages of the present system. Passengers can leave the aircraft as soon as the aircraft has come to a stop, the doors are open, and the stairs are in place without waiting for the aircraft's engines to be turned off and the turbines to stop moving. Since aircraft have two front and two rear doors, stairs could be provided for all four doors. All four doors could be used by the passengers leaving the aircraft, which would empty it very quickly. Deplaning and boarding could be conducted simultaneously, with deplaning passengers leaving by one set of doors and boarding passengers by another set.

Since this type of aircraft is often used by low cost carriers that usually do not clean the aircraft between arrival and departure in the interest of a faster turnaround, time typically set aside to clean or tidy the aircraft between flights is not needed. If an airline does clean aircraft between flights, the cleaning process can be quicker and more efficient since cleaning crews can enter through forward or rear doors and proceed through the aircraft in one direction without having to turn around or move past other cleaning crew members.

External servicing of the aircraft can take place as soon as the aircraft pulls into the gate area and while passengers are leaving and entering the aircraft, which can reduce the time the aircraft is on the ground even more. Internal servicing could be conducted, without passengers onboard the aircraft, similarly to cleaning, with service personnel moving through the aircraft in a single direction to carry out their service tasks more efficiently.

Aircraft that use stairs instead of jet bridges can park closer to gates and terminal services, thus minimizing the distance passengers and crew need to walk to the gate or terminal building. Ground level covered walkways with roofs below aircraft wing heights could also be provided to direct deplaning and boarding passengers toward the terminal or toward the aircraft since these passengers deplane and board the aircraft at different locations. Particularly in very cold, wet, or hot climates, providing covered walks and/or minimizing the distance passengers must walk to a terminal can increase passengers' comfort and convenience. An aircraft parked closer to a terminal may also be closer to services, such as fuel lines, for example. As discussed above, baggage conveyors and/or catering services could be located to extend out of the terminal toward an aircraft, much like flexibly movable jet bridges, to facilitate unloading and loading of baggage, cargo, food, and beverages.

An alternative embodiment of the present gate traffic and parking management system is shown in FIGS. 6a-6e. Instead of using tow vehicles to move aircraft in a forward direction into and out of a gate or parking location, a conveyor track 150 (not drawn to scale) is provided that is configured to guide an aircraft 152 into and out of a gate or other parking location near an airport terminal. The aircraft 152 may be attached to the conveyor track 150 at a convenient location away from the terminal after the aircraft has landed and shut off its engines. The conveyor track 150, which is preferably built into the tarmac or other ramp or gate area surface, is designed to move the attached aircraft along a path circumscribed by the track, much as a car is moved through a carwash. One possible configuration of a conveyor track 150 is shown in FIGS. 6a-6e. Other configurations that function to move an aircraft into and out of a terminal parking space are also contemplated to be within the scope of the present invention. The conveyor track 150 may also have a slightly different shape, depending on whether an aircraft is to be guided into and out of a parking location parallel to a terminal building 154, such as in FIGS. 6a-6e, or whether an aircraft is to be guided into and out of a parking location perpendicular to the terminal building (not shown). Flexible jet bridges 156 are shown folded in FIGS. 6a and 6b as the aircraft is guided toward the terminal 154 and also in FIGS. 6d and 6e as the aircraft is guided away from the terminal 154. The jet bridges 156 are unfolded and extended in FIG. 6c to allow arriving passengers to deplane and departing passengers to board.

Conveyor tracks are known and may be modified to move an aircraft as described herein. Any type of conveyor track capable of moving an aircraft along a path to park near an airport terminal as described to unload and load passengers and then to move the aircraft along a path to a designated airport location where the aircraft's engines may be started for takeoff is contemplated to be within the scope of the present invention.

While the present invention has been described with respect to preferred embodiments, this is not intended to be limiting, and other arrangements and structures that perform the required functions are contemplated to be within the scope of the present invention.

INDUSTRIAL APPLICABILITY

The airport terminal traffic and parking management system of the present invention will find its primary applicability where it is desired to use tow vehicles, aircraft-moving transfer modules, or other aircraft moving equipment to move aircraft on the ground between landing and takeoff to increase the efficiency and safety of, reduce the time required for, and reduce causes for delay of airport gate operations, improving gate traffic flow.

The invention claimed is:
1. A method for managing aircraft gate traffic and parking at an airport to increase safety and efficiency, improve flow of aircraft traffic, and reduce aircraft time at an airport terminal, comprising;
  a. providing at an airport tow vehicles comprising tow vehicles attached to aircraft with tow bars, tow vehicles attached to aircraft without tow bars, remotely controlled tow vehicles, tow vehicles remotely attached and detached to and from aircraft, and aircraft-moving transfer modules to move one or more aircraft in only a forward direction during ground operations to gates, stands, or parking spaces at the airport without operation of the aircraft's engines or consideration of jet blast and engine ingestion;
  b. attaching a tow vehicle to one or more aircraft after landing and controlling the tow vehicle to move the aircraft in a forward direction without aircraft engines to a gate, stand, or parking space at an airport terminal building defined to provide at least a minimum clearance for the aircraft to enter the defined space, turn in the defined space, and leave the defined space while the aircraft is moving in only the forward direction;
  c. providing at least two jet bridges rotatably attached to the airport terminal building and extendible perpendicularly from the airport terminal building to form simultaneous perpendicular parallel connections between front and rear doors of the aircraft and the airport terminal building;
  d. moving the aircraft with the tow vehicle in the forward direction, parking the aircraft with a longest axis of the aircraft parallel to the airport terminal building within the defined space so that cargo doors are facing toward or away from the airport terminal building, and rotating and extending the at least two jet bridges to form the simultaneous perpendicular parallel connections between the front and rear doors of the aircraft and the airport terminal building;
  e. at departure, rotating and retracting the at least two jet bridges to the airport terminal building, moving the aircraft in the forward direction within the defined space with the tow vehicle to a tow vehicle detachment location, and detaching the tow vehicle prior to engine start and takeoff.

2. The method of claim 1, further comprising using all doors on the aircraft to unload and load passengers.

3. The method of claim 2, further comprising providing access stairs for access to doors of the aircraft not connected to the jet bridges, and directing passengers to leave said aircraft simultaneously with passengers entering said aircraft after the tow vehicle has parked said aircraft within the defined space.

4. The method of claim 1, further comprising moving the aircraft with the tow vehicle to a parking stand at an airport terminal building without jet bridges and providing access stairs for all said aircraft's front and rear doors, and directing passengers leaving the aircraft to exit the aircraft through one set of front or rear doors, and directing passengers boarding the aircraft to enter the aircraft through a different set of front or rear doors.

5. The method of claim 1, further comprising providing ground services comprising at least baggage services, catering, and aircraft fuel services integrally located at said gate, stand, or parking space so that said services are easily accessible and providing said ground services to said aircraft as soon as said aircraft is moved forward into and parked within the defined space.

6. The method of claim 1, further comprising moving a plurality of the one or more aircraft in only a forward direction into and out of the gates, stands, and parking spaces at the airport by the tow vehicles.

7. The method of claim 1, further comprising defining said space to maximize a number of aircraft that can be moved into and out of said gates, stands, and parking spaces at the airport by said tow vehicles.

8. The method of claim 1, further comprising providing a remotely controlled dedicated aircraft-moving apparatus for each of a plurality of aircraft at the airport, and parking said each of the plurality of aircraft in an orientation with a longest axis of said aircraft oriented parallel to said airport terminal.

9. The method of claim 1, further comprising attaching jet bridges or stairs to at least a front aircraft door and a rear aircraft door, and directing passengers and airline personnel leaving or entering the aircraft to use only selected front or rear doors.

10. The method of claim 1, further comprising
  a. moving the aircraft with the tow vehicle in the forward direction to park the aircraft with a longest axis of the aircraft perpendicular to the airport terminal building within the defined space;

b. rotating and extending one of the at least two jet bridges from the airport terminal building to form a perpendicular connection between a door of the aircraft and the jet bridge; and c. at departure, retracting the jet bridge to the airport terminal building, moving and turning the aircraft in only the forward direction within the defined space with the tow vehicle, and continuing to move the aircraft in the forward direction to the tow vehicle detachment location.

11. The method of claim 10, further comprising providing access stairs for access to doors of the aircraft not connected to the jet bridge, and directing passengers to leave said aircraft simultaneously with passengers entering said aircraft after the tow vehicle has parked said aircraft within the defined space.

* * * * *